Patented Aug. 6, 1946

2,405,538

UNITED STATES PATENT OFFICE 2,405,538

FOAM GENERATION

Clifford B. White, Elmira, N. Y., assignor to American-La France-Foamite Corporation, Elmira, N. Y., a corporation of New York No Drawing. Application June 26, 1943, Serial No. 492,651

5 Claims. (Cl. 252—6.5)

This invention is a foam generator powder mixture useful for extinguishing fires of burning alcohol and like solvents, and includes the process. Foam generator powder is well known and functions by being poured into the hopper of a water-jet ejector, called a generator, from which it is drawn into the water stream by the ejector suction. It is commonly constituted of a dry mixture of aluminum sulfate and sodium bicarbonate with some dry stabilizer, such as licorice extract, and commonly also with some portion of clay or other inert filler added. The two reagents dissolve in the water stream and react in transit through the hose or conduit to which the generator is connected, and emerge from the hose outlet in the form of compact foam, which will cling to vertical surfaces and in the usual case will float on a burning liquid, forming a fire-smothering blanket thereon.

However, when the burning liquid is alcohol, acetone or some of the other industrial solvents, the foam produced of the substances just stated, quickly breaks down, being then quite ineffectual for forming the required blanket. The purpose of this invention is to render such generator-produced foam capable of floating indefinitely on solvent-type liquids.

This is accomplished by substituting for some or all of the inert filler in a composition such as above described and mixing well into it, a portion of zinc stearate equal to about 4% to 12% of the total mixture by weight. Although zinc stearate is totally insoluble in water as well as in the reacting solutions flowing through the hose, the effect is found to be that the foam resulting from feeding such mixture to a generator is unaffected by contact with alcohol or solvent and is thus an effective extinguishing agent for solvents fires. The effect may be due to the presence in the bubble film walls of many fine particles of the stearate, which appear to have the effect of insulating the bubbles, so to speak, from contact with the alcohol or at least from dehydrating contact with it.

I am aware that it has been proposed to introduce fatty acids and possibly the salts thereof into fire-extinguishing foam to give it alcohol resistance. This has been attempted by compounding one of the solutions of a two-solution foam type extinguisher with additional ingredients calculated to cause a fatty acid to be chemically formed in situ in the reaction mixture, thus to become incorporated in the bubbles, but such procedure is unsatisfactory, because in the first place the foam thereby produced is not in fact resistant to solvents, certainly not to undiluted solvents, and in the second place, the process requires the preparation of the special solutions in advance of use, and is therefore limited to the small unit or single-charge type of extinguishing equipment.

The efficiency of the foam produced by this invention can be attributed to the turbulence which occurs in the throat of the generator, and which is extremely violent, and results in such a thorough distribution of the fine stearate particles that no agglomeration of them is possible, and each of the foam bubbles acquires a sufficient number of them, held in its film wall, to constitute a sort of buffer or barrier preventing dehydration.

At the same time the added stearate, being insoluble and inert, admirably performs the function of the clay filler which it may substitute, that function being to retard or restrain the chemical reaction of the alum and soda, and prevent any slow reaction of them while in storage. Preferably the new mixture contains both stearate and clay filler, the latter in reduced amount, but the clay is not indispensable.

The preferred formula is as follows:

| | Per cent |
|---|---|
| Aluminum sulfate, or equivalent | 40 |
| Sodium bicarbonate, or equivalent | 40 |
| Stabilizer (licorice or equivalent) | 5 |
| Zinc stearate or equivalent | 6 |
| Clay | 9 |

Variation from these exact figures is obviously possible, particularly as to the amount of stabilizer which depends on its kind, and the clay. The basic and acid gas-evolving reagents are best present in substantially molecular proportions. As equivalents of the zinc salt there can be used, with like effect, such water-insoluble fatty-acid salts as magnesium stearate, calcium stearate, zinc laurate, calcium laurate, zinc palmitate also other fine-textured water-insoluble members of the carboxylated saturated long-chain aliphatic hydrocarbons containing at least six and not more than eighteen carbon atoms. This includes the acid such as stearic acid as well as the salts, but only in fine texture form, and such alternate substances, or mixtures of them, are effective when used in about the same relative proportions as above given for the zinc stearate, which is to say, about 6% of the total mixture by weight. Less than 4% produces no observable or useful alcohol resistance, while more than 12% impairs the quality of the foam and is wasteful, so far as results are concerned. By fine texture is meant impalpable fineness of particle size like that of ordinary zinc stearate which is believed not to exceed 50 microns average diameter, and which is thereby suited for being held in the thin wall of the foam bubble. If the added resistance agent is not naturally in such state of fineness, it must be reduced to that condition before being incorporated in the generator powder mixture.

I claim:

1. As a new composition of matter, a foam generator powder mixture containing in combination with dry foam-generating reagents, in reacting proportions, a stabilizer, and between 4% and 12% of fine-textured particles of a water-insoluble substance selected from the group which consists of carboxylated, saturated long-chain aliphatic hydrocarbons having more than six and not more than eighteen carbon atoms.

2. As a new composition of matter, a foam generator powder mixture containing reacting proportions of acid and basic powdered gas-evolving reagents, a dry stabilizer and upward of 4% of a water-insoluble salt of a saturated fatty acid well distributed in the mixture.

3. As a new composition of matter, a foam generator powder mixture composed of reacting proportions of dry acid and basic powdered gas-evolving reagents, a powdered stabilizer, about 6% of fine-textured insoluble salt of a saturated fatty acid and a small portion of powdered clay-like material.

4. As a means of extinguishing solvent fires, the combination of dry acid and basic reagents, dry stabilizer and approximately 6% of zinc-stearate well distributed in the mixture.

5. The process of making solvent-resistant foam which comprises vigorously mixing with water, dry acid and basic gas-evolving reagents, dry stabilizer and between about 4% and 12% of fine-textured particles of a water insoluble member of the group which consists of the carboxylated saturated long-chain aliphatic hydrocarbons, having more than six and not more than eighteen carbon atoms and delivering the turbulent mixture through a conduit in the form of foam.

CLIFFORD B. WHITE.